United States Patent
Liu et al.

(10) Patent No.: US 6,672,926 B2
(45) Date of Patent: Jan. 6, 2004

(54) METHOD OF FABRICATING EMITTER OF FIELD EMISSION DISPLAY

(75) Inventors: Wen-Tsang Liu, Taipei (TW); Yui-Shin Fran, Hsinchu (TW); Lai-Cheng Chen, Taipei (TW)

(73) Assignee: Delta Optoelectronics, Inc., Hsinchu (TW)

( * ) Notice: Subject to any disclaimer, the term of this patent is extended or adjusted under 35 U.S.C. 154(b) by 78 days.

(21) Appl. No.: 10/033,754

(22) Filed: Dec. 19, 2001

(65) Prior Publication Data

US 2002/0182970 A1 Dec. 5, 2002

(30) Foreign Application Priority Data

Jun. 1, 2001 (TW) ........................................ 90113302 A
Aug. 29, 2001 (TW) ................................ 90113302AO1 A

(51) Int. Cl.⁷ .................................................. H01J 9/02
(52) U.S. Cl. .............................. 445/51; 445/50; 445/49
(58) Field of Search .............................. 445/24, 25, 49, 445/50, 51; 313/495, 496, 497, 310, 311, 346 R, 351, 326

(56) References Cited

U.S. PATENT DOCUMENTS

| 5,911,616 | A | * | 6/1999 | Levine et al. .................. 445/52 |
| 5,942,841 | A | * | 8/1999 | Chakravorty ................ 313/309 |
| 6,019,656 | A | * | 2/2000 | Park et al. ..................... 445/24 |
| 6,057,637 | A | * | 5/2000 | Zettl et al. .................... 313/310 |
| 6,062,931 | A | * | 5/2000 | Chuang et al. ................ 445/50 |
| 6,235,545 | B1 | * | 5/2001 | Derraa ......................... 445/50 |
| 6,250,984 | B1 | * | 6/2001 | Jin et al. ....................... 445/51 |
| 6,339,281 | B2 | * | 1/2002 | Lee et al. .................... 313/351 |
| 6,406,926 | B1 | * | 6/2002 | O'Rourke et al. ............. 445/49 |
| 6,472,802 | B1 | * | 10/2002 | Choi et al. ................... 313/310 |
| 6,486,599 | B2 | * | 11/2002 | Wang et al. ................... 445/24 |
| 6,498,426 | B1 | * | 12/2002 | Watabe et al. ................. 445/50 |
| 6,514,113 | B1 | * | 2/2003 | Lee et al. ...................... 445/50 |
| 6,537,122 | B1 | * | 3/2003 | Amey et al. ................... 445/51 |

* cited by examiner

Primary Examiner—Dean A. Reichard
Assistant Examiner—Angel R. Estrada
(74) Attorney, Agent, or Firm—J.C. Patents

(57) ABSTRACT

A method of fabricating an emitter of a field emission display. A mixture of metal and silver paste with glass material is screen printed on a substrate as a silver electrode. The metal is selected from a hard solder alloy such as Al/Si alloy containing tin, zinc, aluminum or other low melting point metal. Alternatively, the metal and the silver paste with the glass material are separately screen printed on the substrate. The metal is selected from tin, zinc, aluminum, or an alloy with a low melting point such as aluminum/silicon alloy. A carbon nano-tube layer is formed on the silver electrode by coating the carbon nano-tube material with the electric arc. Alternately a catalyst layer can be formed on the silver electrode prior to the formation of the carbon nano-tube layer. A metal layer such as nickel and copper is formed on the carbon nano-tube layer to prevent the carbon nano-tube layer from absorbing gas.

21 Claims, 3 Drawing Sheets

METHOD OF FABRICATING EMITTER OF FIELD EMISSION DISPLAY

CROSS-REFERENCE TO RELATED APPLICATION

This application claims the priority benefit of Taiwan application serial no. 90113302 and 90113302A01, filed Jun. 1, 2001 and Aug. 29, 2001.

BACKGROUND OF THE INVENTION

1. Field of Invention

This invention relates in general to a method of fabricating an emitter of a field emission display (FED). More particularly, this invention relates to a method of fabricating a carbon nano-tube (CNT) type emitter of a field emission display.

2. Description of the Related Art

The current flat panel display includes the conventional cathode ray tube (CRT), the thin-film transistor liquid crystal display (TFT-LCD), the plasma display panel (PDP) and the field emission display. As the field emission display has a short optical response time for switching operation of the pixel circuit that fabricates the image, a better quality of display is obtained. The field emission display further has the properties of small thickness (about 2–10 cm), light weight (smaller than about 0.2 kg), wide vision angle (slightly large than 80°), high brightness (about 150 $Cd/cm^2$), flexible working temperature (about $-0°$ C. to about 80° C.), and low power consumption (slightly smaller than 1 Watt). Thus, field emission display is one of the techniques with the most potential in the flat panel display industry in $21^{st}$ century.

The field emission display is basically formed of two substrates with spacers between. The top glass plate is coated with phosphors as an anode plate. A gate plate can discharge field emission array (FEA) of an electron beam. The field emitted electrons from the gate are accelerated by the positive potential between the anode plate and the gate plate to bombard the phosphors. The so-called catholuminescence is generated.

Most field emission arrays of conventional field emission displays belong to the tip emitter type formed of pixels with a matrix addressing function. Each pixel comprises hundreds of minute tips. The tip structure has a dimension of about 1 micron (the tip bottom) with a curvature smaller than about 0.1 micron. The material of the tip includes molybdenum, tungsten, platinum, or a semiconductor such as silicon or diamond, such as the molybdenum tip used by Charles Spindt in 1976. The tip structure provided by Charles Spindt has the drawback of difficulties in using evaporation equipment and peeling technique. For example, the electron beam provided by the evaporator may cause the tip structure to have various tilt angles. In addition, the equipment is too huge to control. The reproducibility is low and the cost is too high, causing a problem for mass production.

Another kind of field emission display includes a carbon nano-tube (CNT) emitter that can use the simple thick film process to reduce cost.

In FIG. 1, a schematic drawing of a carbon nano-tube type emitter of a conventional field emission array is shown. In the method of fabricating such conventional nano-tube type emitter, a silver electrode 102 is formed on a substrate using screen printing. A carbon nano-tube layer 104 is formed on the silver electrode 102 to complete the fabrication of the carbon nano-tube emitter. The method of forming the carbon nano-tube layer includes mixing the carbon nano-tube material with a conductive epoxy or using chemical vapor deposition (CVD) with acetylene, ethylene or methane/hydrogen as the reacting gas. The reacting gas is then decomposed to grow the carbon nano-tube 104 with the aid of a catalyst of iron/cobalt/nickel under a high temperature. Another method for forming the carbon nano-tube 104 includes mixing the carbon nano-tube material with silver paste, which is then coated on the substrate 100 using a screen printing technique. As the device requires a large electric field of 2 to 6 V/m to emit electrons, a very large electric field is applied between the cathode and anode. If the carbon nano-tube material on the silver paste is not adhesive enough, it will cause the carbon nano-tube material to peel off. After peeling off, the carbon nano-tube particles and the large electric field induce the high speed electrons to simultaneously bombard the phosphors at the anode. The phosphors are thus exfoliated, shortening the lifetime of the device.

In addition, in view of carbon nano-tube material source, the yield of the carbon nano-tube material obtained by electric arc discharge is low and the adhesion thereof is poor. The carbon nano-tube material obtained from thermal decomposition of chemical vapor deposition or plasma-enhanced chemical vapor deposition (PECVD) has a high purity. However, such carbon nano-tube material still has the problem of poor adhesion.

As the carbon nano-tube is a carbon material with a large surface area, a large amount of gas is absorbed. Such absorbed gas causes a great problem in the later vacuum packaging process. It also causes unwanted arc discharge to affect the performance of the display.

SUMMARY OF THE INVENTION

The invention provides a method of fabricating an emitter of a field emission display. By coating a mixture of a metal with a low melting point such as tin, zinc, or aluminum, and silver paste, or coating a silver layer first, followed by a chemical coating or electroplate technique to coat a metal layer, the adhesion of the carbon nano-tube material is effectively enhanced.

The invention further provides a method of fabricating an emitter of a field emission display that forms a metal layer to cover a surface of the carbon nano-tube, so that the large amount of gas absorbed by and released from the carbon nano-tube is prevented.

The method of fabricating the emitter of the field emission display in the invention further includes raising the temperature after forming the carbon nano-tube, so that the glass material in the electrode is softened. Through the softening effect of the glass material, the adhesion between the electrode and substrate and carbon nano-tube is improved.

In the method of fabricating an emitter of a field emission display provided by the invention, a mixture of metal and silver paste with glass material is screen printed on a substrate as a silver electrode. Alternatively, the metal and the silver paste with glass material can be coated on the substrate separately. The above metal includes tin, zinc, aluminum or a hard solder alloy with a low melting point such as aluminum/silicon alloy. A catalyst layer can be formed on the silver paste to improve the subsequent carbon nano-tube formation process. The carbon nano-tube is formed on the silver paste, and a metal layer is formed on the carbon nano-tube. The metal layer comprises a nickel layer or a copper layer and has the function of preventing the carbon nano-tube from absorbing gas.

Both the foregoing general description and the following detailed description are exemplary and explanatory only and are not restrictive of the invention, as claimed.

PREFERRED EMBODIMENT OF THE INVENTION

Figure 1:
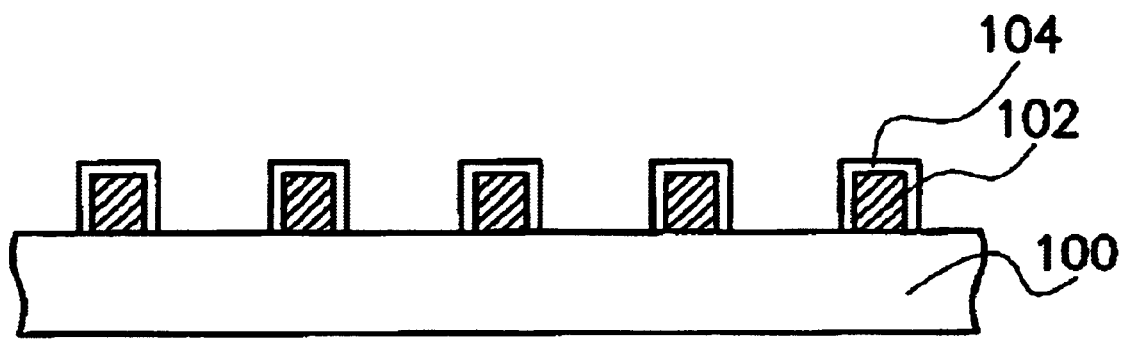
FIG. 1 shows a carbon nano-tube type emitter of a conventional field emission array.
Figure 2:
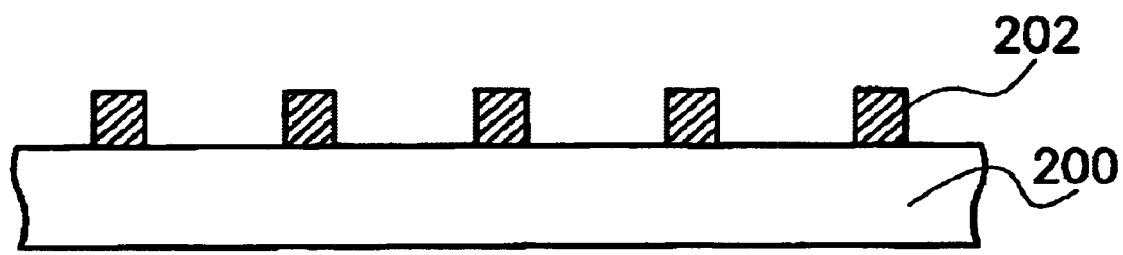
FIG. 2 to FIG. 4 show the method of fabricating the carbon nano-tube type emitter of a field emission array in one embodiment of the invention.
Figure 3:
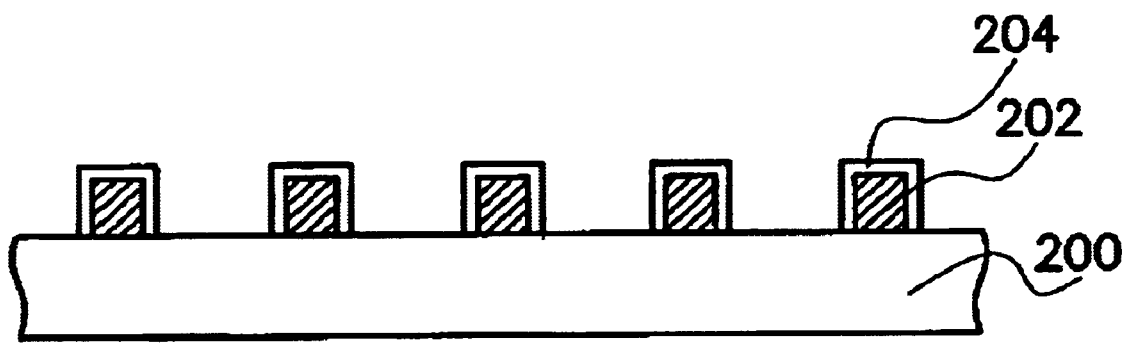
Figure 4:
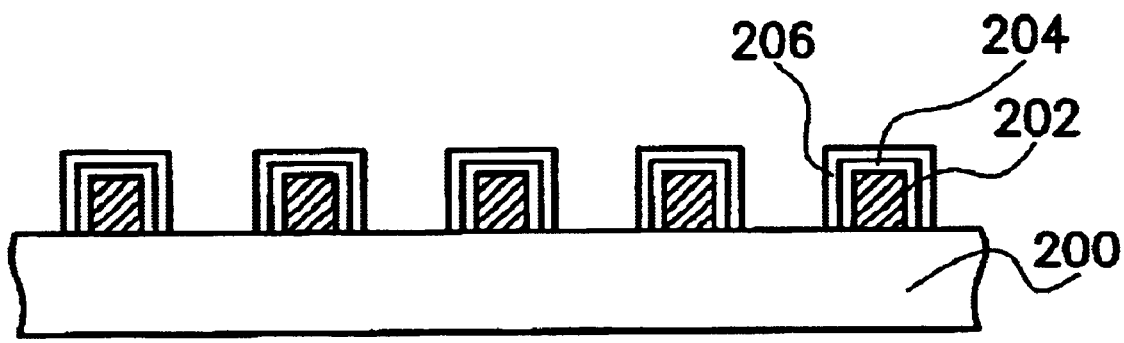

FIG. 2 to FIG. 4 show the method of fabricating the carbon nano-tube type emitter of a field emission array in one embodiment of the invention. In FIG. 2, a substrate 200, for example, a glass substrate, is provided. An electrode 202 is formed on the substrate 200. The electrode 202 includes a silver (Ag) electrode, for example. The method of forming the electrode 202 includes screen printing a mixture of a metal or an alloy with a low melting point and a silver paste containing glass material. The metal includes tin (Sn), zinc (Zn), aluminum (Al) or a hard solder alloy such as aluminum/silicon (Al/Si) alloy. Or alternatively, the electrode 202 can be formed by screen printing the silver paste on the substrate 200 first, followed by forming the low melting point metal or hard solder alloy on the silver paste using electroplating, vacuum evaporation or vacuum sputter method. Again, the low melting point metal or alloy includes tin, zinc, aluminum or an aluminum/silicon alloy.

In FIG. 3, a carbon nano-tube layer 204 is formed on the electrode 202. The method of forming the carbon nano-tube layer 204 includes a step of chemical vapor deposition, or forming a catalyst layer in advance. In addition, the carbon nano-tube layer 204 can also be formed by making the powders obtained from arc discharge or chemical vapor deposition into a paste, and then screen printing this paste as the carbon nano-tube layer 204 on the electrode 202. As the electrode 202 is a metal or alloy with a low melting point, the adhesion between the electrode 202 and the substrate 200, and between the electrode 202 and the carbon nano-tube layer 204 is good. As a result, the performance of the display is highly improved.

In FIG. 4, a metal layer 206 is coated on the surface of the carbon nano-tube layer 204. The material for forming the metal layer 206 includes nickel (Ni) or copper (Cu) for a better adhesion with the carbon nano-tube layer 204. The method for forming the metal layer 206 includes electroplating or chemical plating. The carbon nano-tube layer 204 typically has a large surface area, so that gas is easily absorbed thereby. The gas absorbed in the carbon nano-tube layer 204 causes problems during the later vacuum packaging process of the device, and also unwanted arc discharge phenomenon. The metal layer 206 encloses the carbon nano-tube layer 204 therein, so that the carbon nano-tube layer 204 does not absorb a great amount of gas. It is thus advantageous to the device vacuum package yield. The substrate 200 with the electrode 202 and the carbon nano-tube layer 204 is then disposed in a high temperature environment such as a high temperature furnace for sinter.

Figure 5:
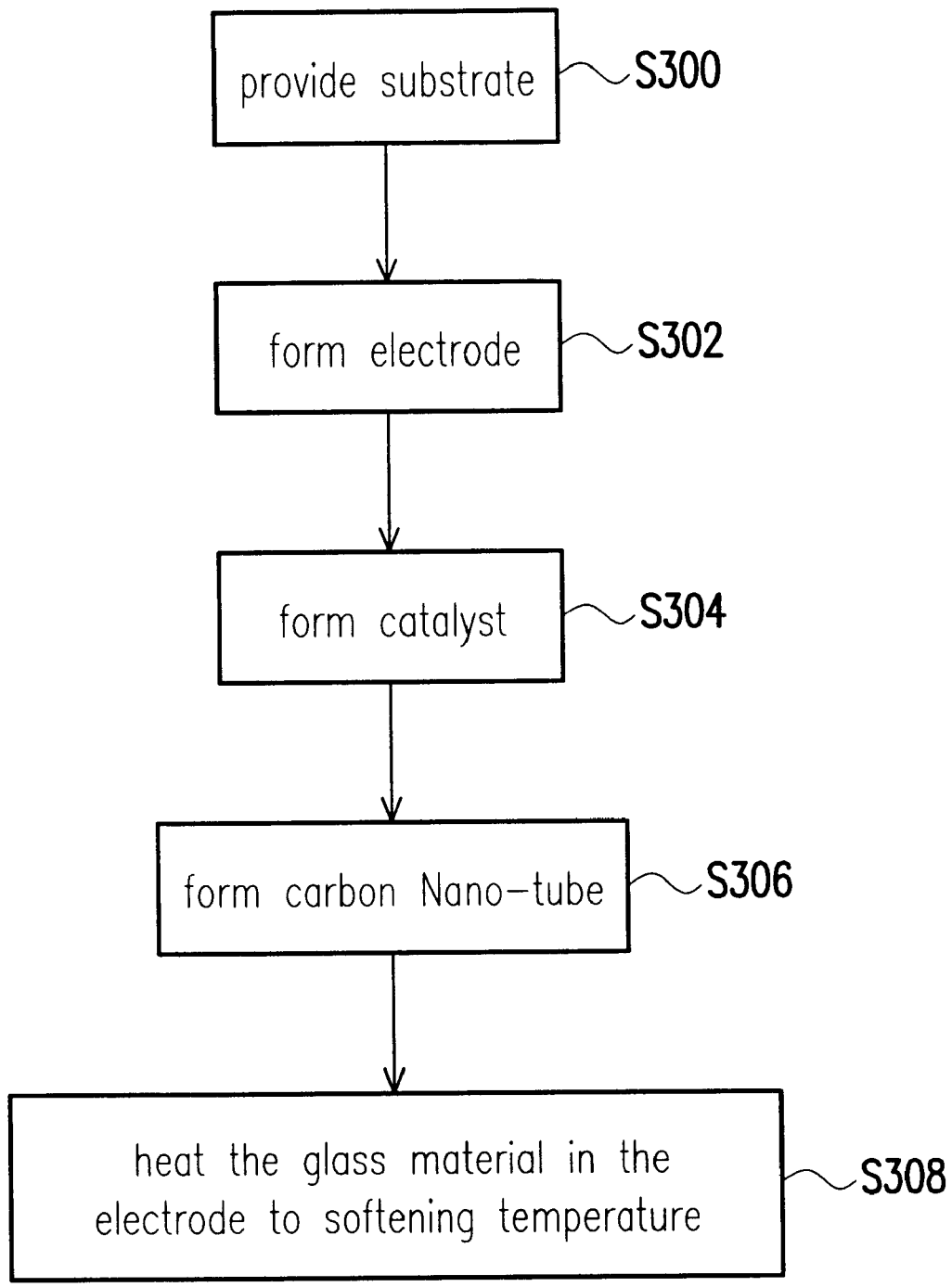
FIG. 5 shows a flowchart of the method for forming the emitter of the field emission display.

In FIG. 5, a flow chart of forming a field emission array of carbon nano-tube type is shown. A substrate is provided in step S300. The substrate includes a glass substrate. In step S302, an electrode is formed on the substrate. The electrode includes a silver electrode, and the method for forming the silver electrode includes screen printing a mixture of a glass material and a silver paste on the substrate to obtain a better adhesion.

After forming the electrode in step S302, a carbon nano-tube is formed on the electrode, for example, using chemical vapor deposition to grow a layer of carbon nano-tube material in step S306. The formation of the carbon nano-tube includes decomposing and growing the carbon nano-tube material in a high temperature environment. In addition, the formation of the carbon nano-tube can be achieved by screen printing a paste obtained from powder formed by arc discharge or chemical vapor deposition on the electrode.

Before the step S306 for forming the carbon nano-tube, a layer of catalyst required for growing the carbon nano-tube can be formed in step S304. A better adhesion between the electrode and the carbon nano-tube is obtained. To form the catalyst layer, acetylene, ethylene, or methane/hydrogen is used as the reaction gas. The carbon nano-tube can thus be formed in a high temperature environment with iron/cobalt/nickel as catalyst.

In the above process for forming the electrode, the steps of providing the substrate S300, forming the electrode S302, forming the catalyst S304 and forming the carbon nano-tube S306 can be adjusted according to specific requirements.

However, in the above process for forming the electrode, including the steps of providing the substrate S300, forming the electrode S302, forming the catalyst S304 and forming the carbon nano-tube S306, adhesion between the electrode and substrate and carbon nano-tube can further be improved. Thus, after forming the carbon nano-tube in step S306, the glass material of the electrode is heated to a softening temperature in step S308. As the softening temperature softens the glass material contained in the electrode, the softened glass material effectively enhances the adhesion between the electrode and substrate and carbon nano-tube.

According to the above, the invention comprises at least the following advantages:

1. The invention uses the metal or alloy with a low melting point to mix with the silver paste, so that a better adhesion is obtained between the electrode and the carbon nano-tube layer formed subsequently. The peeling effect of the carbon nano-tube layer under a high electric field operation is thus avoided, and consequently, the lifetime of the field emission display is elongated.

2. The carbon nano-tube layer is covered with a metal layer that has a strong adhesion with the carbon nano-tube layer to prevent it from absorbing and releasing a great amount of gas. The yield of the later stage of vacuum packaging is thus improved.

3. The invention changes the material of the electrode and encloses the carbon nano-tube layer with a metal layer to improve the reliability and lifetime of the field emission display, and the yield of the later stage of vacuum packaging.

4. In the invention, as the glass material contained in the electrode is softened by a heating step, the adhesion between the electrode, the substrate and the carbon nano-tube is effectively improved to prevent the peeling effect of the carbon nano-tube under a high electric field. The reliability and lifetime of the field emission display are enhanced.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. A method of fabricating an emitter of a field emission display, comprising at least:

providing a substrate;

forming a mixture of a metal and a conductive paste on the substrate as a coductive electrode, wherein the metal is selected from a group consisting of tin, zinc, aluminum and other metals with a low melting point, and wherein the conductive electrode is mixed with a glass material; and forming a carbon nano-tube layer on the conductive electrode.

2. The method according to claim 1, wherein the step of forming the conductive electrode includes using a silver paste as the conductive paste.

3. The method according to claim 1, further comprising a high temperature heating step after forming the conductive electrode to soften the glass material, so as to increase an adhesion between the electrode, the substrate and the carbon nano-tube.

4. The method according to claim 1, wherein the step of forming the carbon nano-tube layer includes a step of screen printing a paste formed of powders obtained from arc discharge or chemical vapor deposition.

5. The method according to claim 1, wherein the step of forming the carbon nano-tube layer includes a step of performing chemical vapor deposition.

6. The method according to claim 5, further comprising a step of forming a catalyst layer prior to forming the carbon nano-tube layer using chemical vapor deposition.

7. The method according to claim 6, wherein the step of forming the catalyst layer includes using material of iron, cobalt and nickel.

8. The method of fabricating an emitter of a field emission display, comprising:

providing a substrate;

forming a mixture of a first metal layer and a conductive paste on the substrate as an electrode;

forming a carbon nano-tube layer on the electrode; and forming a second metal layer on the carbon nano-tube layer to prevent the carbon nano-tube layer from absorbing and releasing gas.

9. The method according to claim 8, wherein the step of forming the electrode includes using a silver paste as the conductive paste.

10. The method according to claim 9, wherein the step of forming the electrode includes using a conductive electrode containing a glass material.

11. The method according to claim 10, further comprising a high temperature heating step after forming the electrode to increase an adhesion between the electrode and the substrate and the carbon nano-tube.

12. The method according to claim 8, wherein a material of the first metal layer is selected from a group consisting of tin, zinc, aluminum and other metals with a low melting point.

13. The method according to claim 8, wherein the step of forming the carbon nano-tube layer includes a step of screen printing a paste of formed of powders obtained from arc discharge or chemical vapor deposition.

14. The method according to claim 8, wherein the step of forming the carbon nano-tube layer includes a step of chemical vapor deposition.

15. The method according to claim 14, further comprising a step of forming a catalyst layer prior to forming the carbon nano-tube layer using chemical vapor deposition.

16. The method according to claim 8, wherein the step of forming the second metal layer includes using material of iron, cobalt and nickel.

17. The method of fabricating an emitter of a field emission display, comprising:

providing a substrate;

forming an electrode on the substrate, wherein the electrode is mixed with a glass material;

forming a carbon nano-tube layer on the electrode;

forming a catalyst layer prior to forming the carbon nano-tube layer using chemical vapor deposition; and performing a heating process to soften the glass material.

18. The method according to claim 17, wherein the step of forming the electrode includes using a silver paste as a conductive paste.

19. The method according to claim 17, wherein the step of forming the carbon nano-tube layer includes a step of screen printing a paste formed of powders from arc discharge or chemical vapor deposition.

20. The method according to claim 17, wherein the step of forming the carbon nano-tube layer includes a step of chemical vapor deposition.

21. The method according to claim 17, wherein the step of forming the catalyst layer includes using material of iron, cobalt and nickel.

* * * * *